(No Model.) 9 Sheets—Sheet 5.

H. E. PRIDMORE.
GRAIN BINDER.

No. 481,530. Patented Aug. 23, 1892.

Witnesses
Wm A. Hinkle
Geo. W. Young.

Inventor
Henry E Pridmore
By his Attorneys
Parkinson & Parkinson

THE NORRIS PETERS CO., PHOTO-LITHO., WASHINGTON, D. C.

(No Model.) 9 Sheets—Sheet 6.
H. E. PRIDMORE.
GRAIN BINDER.

No. 481,530. Patented Aug. 23, 1892.

Witnesses
Wm A. Skinkle
Geo W Young

Inventor
Henry E. Pridmore
By his Attorneys
Parmisan & Parmisan (No Model.) 9 Sheets—Sheet 7.
H. E. PRIDMORE.
GRAIN BINDER.

No. 481,530. Patented Aug. 23, 1892.

Witnesses
Wm A. Skinkle
Geo. W. Young.

Inventor
Henry E. Pridmore.
By his Attorneys (No Model.) 9 Sheets—Sheet 8.

H. E. PRIDMORE.
GRAIN BINDER.

No. 481,530. Patented Aug. 23, 1892.

Witnesses
Wm A. Skinkle
Geo. W. Young

Inventor
Henry E. Pridmore
By his Attorneys
Parmison & Parmison

THE NORRIS PETERS CO., PHOTO-LITHO., WASHINGTON, D. C.

(No Model.)   H. E. PRIDMORE.   9 Sheets—Sheet 9.
GRAIN BINDER.

No. 481,530.   Patented Aug. 23, 1892.

Witnesses
John M. Culver
M. E. Shields

Inventor
HENRY E. PRIDMORE
By his Attorneys
Parkinson & Parkinson

UNITED STATES PATENT OFFICE.

HENRY E. PRIDMORE, OF CHICAGO, ILLINOIS.

GRAIN-BINDER.

SPECIFICATION forming part of Letters Patent No. 481,530, dated August 23, 1892.

Application filed September 1, 1887. Serial No. 248,508. (No model.) Patented in England August 10, 1886, No. 10,212.

*To all whom it may concern:*

Be it known that I, HENRY E. PRIDMORE, a citizen of the United States, residing at Chicago, in the county of Cook and State of Illinois, have invented certain new and useful Improvements in Grain-Binders, (for which Letters Patent of the Kingdom of Great Britain, numbered 10,212, were issued on the 10th day of August, 1886, to William P. Thompson as a communication from Cyrus H. McCormick, Jr.,) of which the following is a specification.

This invention relates in general to an improvement upon the binder shown and described in Letters Patent of the United States No. 339,518, granted April 6, 1886, to the McCormick Harvesting Machine Company, as assignee of William R. Baker and Henry E. Pridmore, a reference to which will facilitate the understanding of the ensuing description; but it will be evident hereinafter that various of the features of the present improvement are of general application irrespective of the specific structure found in said Letters Patent.

For the purposes of this description it may be assumed that the post-frame or main bracket and the transverse metal frame-bars, as also the transverse wooden bars of the binder-frame, are substantially the same as shown and described in that patent, that the main tyer-shaft is journaled in the overhanging arm of the post-frame and the binder-arm shaft in the subtending-arm, and that a main gear and cam wheel is employed at the outer end of said tyer-shaft, that the grain is delivered to the tripping-finger or compressor by means of packers mounted on a crank-shaft, and that the bound sheaf is ejected by revolving arms connected with the tyer-shaft.

The improvements relate to the gear system by which the binder is intermittently driven from the packer or other driving-shaft, to the manner of mounting and controlling the outside compressing and tripping finger and the trip-latch, to the table-trip and its connection with the tripping mechanism, whereby it serves to operate the latter and is itself operated to act as an under compressor, to a novel construction of the cord-holder, and to the combination of such holder with the knotter and of both with the binder-arm, and to various subordinate and accessory features and details, all as hereinafter explained.

In the drawings, Fig. 4, an elevation from the front end, showing particularly the driving-gear system and tripping mechanism; Fig. 9, a detail view of the guide or tightener for the chain belt by which the binder is driven; Fig. 23 is a side view, and Fig. 24 an edge view, of the binder-arm, showing the jog or bend.

A represents the post-frame or main bracket, having one tubular arm or sleeve $a$ overhanging the binder-table or decking and serving as a bearing or support for the tyer-shaft and a second tubular arm or sleeve $a'$ subtending said table and receiving the rock-shaft which carries the binder-arm. Bolted to the foot and lower tubular arm of the post-frame are transverse metal bars $A'$, having each on the outer or stubble side of the arm a bearing $a^2$ for the reception of the rock-shaft which carries the outside compressing-finger and on the inner side another bearing $a^3$ for the packer-shaft or that shaft continuously driven from the harvester. At their extreme inner ends they saddle and are bolted to a tubular frame-bar $A^2$ and at their outer ends just inside the bearings for the compressor-shaft are likewise secured to a second tubular frame-bar $A^3$, extending parallel with the first from front to rear of the binder. Wooden cross pieces or timbers $A^4$, also bolted to these tubular frame-bars, serve to strengthen the frame toward the rear and to receive and support the decking or binding-table.

As thus far described the structure of the binder does not or need not differ materially from that shown in the aforementioned patent to Baker and Pridmore, and in machines built and placed upon the market in accordance therewith for some seasons past.

The changes in the further organization of the machine due to the improvements made the subject-matter of these presents will now be explained.

In the former machine the main gear and cam wheel was driven from the packer-shaft by means of a train of spur-gears, the first of which running loosely on the end of the packer-shaft was alternately actuated and left idle by means of the tripping-clutch mounted on said shaft, and from which a second and third carried the motion to the gear and cam wheel. In the present invention, however, although so far as respects other features the former arrangement may be employed, still it is preferred to dispense with this train and to provide a sprocket-wheel B upon the end of the cranked packer-shaft B', mount an opposing sprocket-wheel B² loosely upon a stub-axle $b$, projecting from the standard of the main bracket or secured in a boss $b'$ thereon adjacent to the main gear or gear and cam wheel B³, and connect the two sprocket-wheels by a chain belt B⁴, as shown. The outer face of the second sprocket-wheel has two studs or rollers $b^2$ and $b^3$ similar to those which in the former machine were carried by a disk or cross-head, affixed to the packer-shaft to afford one member of the tripping-clutch, and a spur-pinion $b^4$, also mounted loosely upon the stub-axle and meshing with the main gear, carries the other member or trip-dog $b^5$, having the usual form and constantly urged into engagement with the rollers on the sprocket-wheel by means of a spring $b^6$, so that whenever it is released by the trip-latch the sprocket-wheel and pinion will be clutched together and the main gear driven from the packer-shaft.

Figure 8:
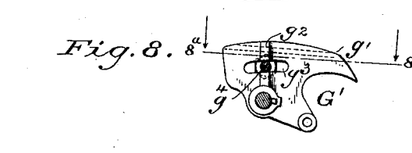
Fig. 8, a side elevation of the supporting-cam block which carries the compressing-finger and sustains the outer end of the table-trip, showing, also, in cross-section the trip-shaft to which said block is keyed and the bolt which clamps the block and compressor together. Fig. $8^a$ is a section through the compressor and its supporting-block, as indicated by the correspondingly-numbered line in the preceding figure.
Figures 8A, 9:
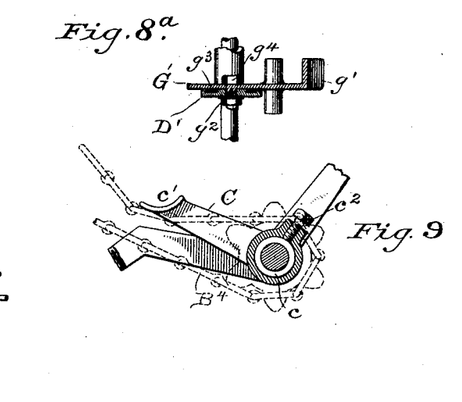
Figure 10:
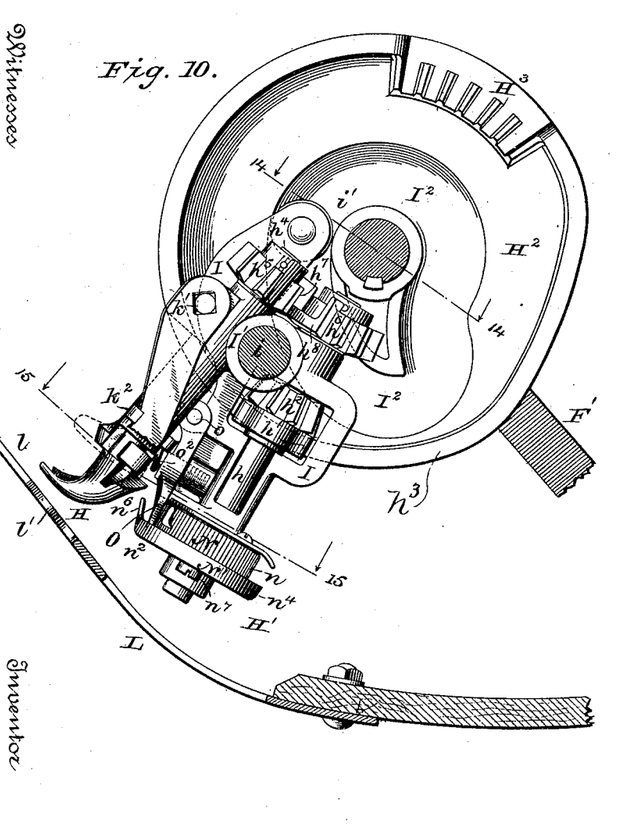
Fig. 10, an elevation from the rear of the tying-head and tyer-cam partly in section, as indicated by line and numerals in the succeeding figure.
Figure 11:
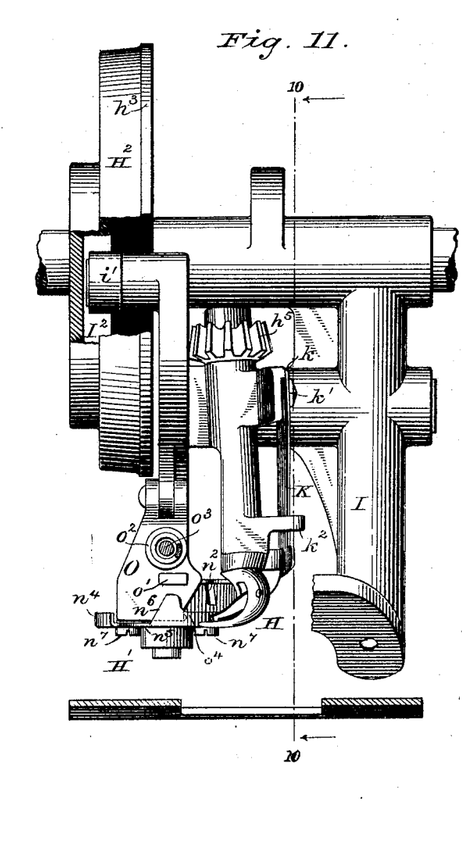
Fig. 11, an elevation of the parts last shown from the grain side with tyer-cam partly broken away.
Figure 12:
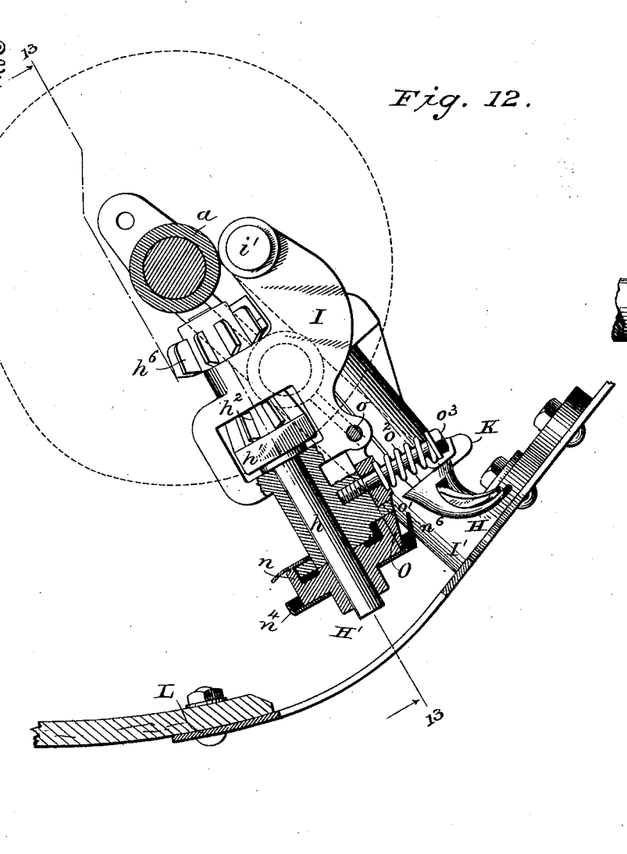
Fig. 12, a vertical section through the tyer-head on the line indicated in Fig. 13 by numerals 12 12 and seen from the front.
Figure 13:
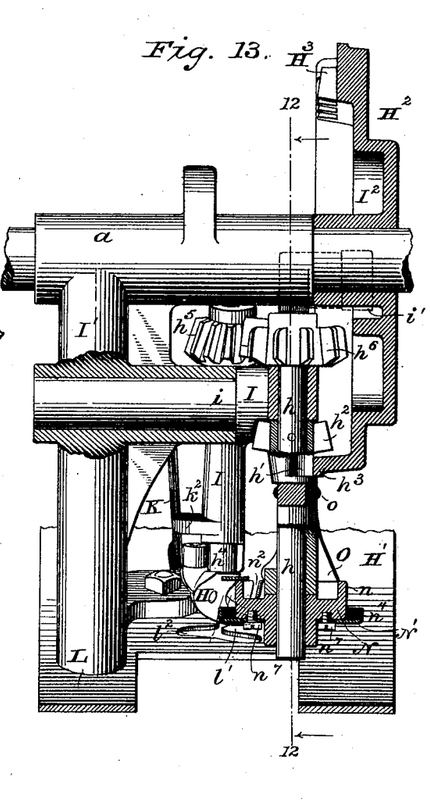
Fig. 13, an elevation of the tyer-head from the stubble side, partly sectioned, as appropriately indicated in the foregoing figure.
Figures 14, 15, 16, 17, 18, 19, 20, 21, 22:
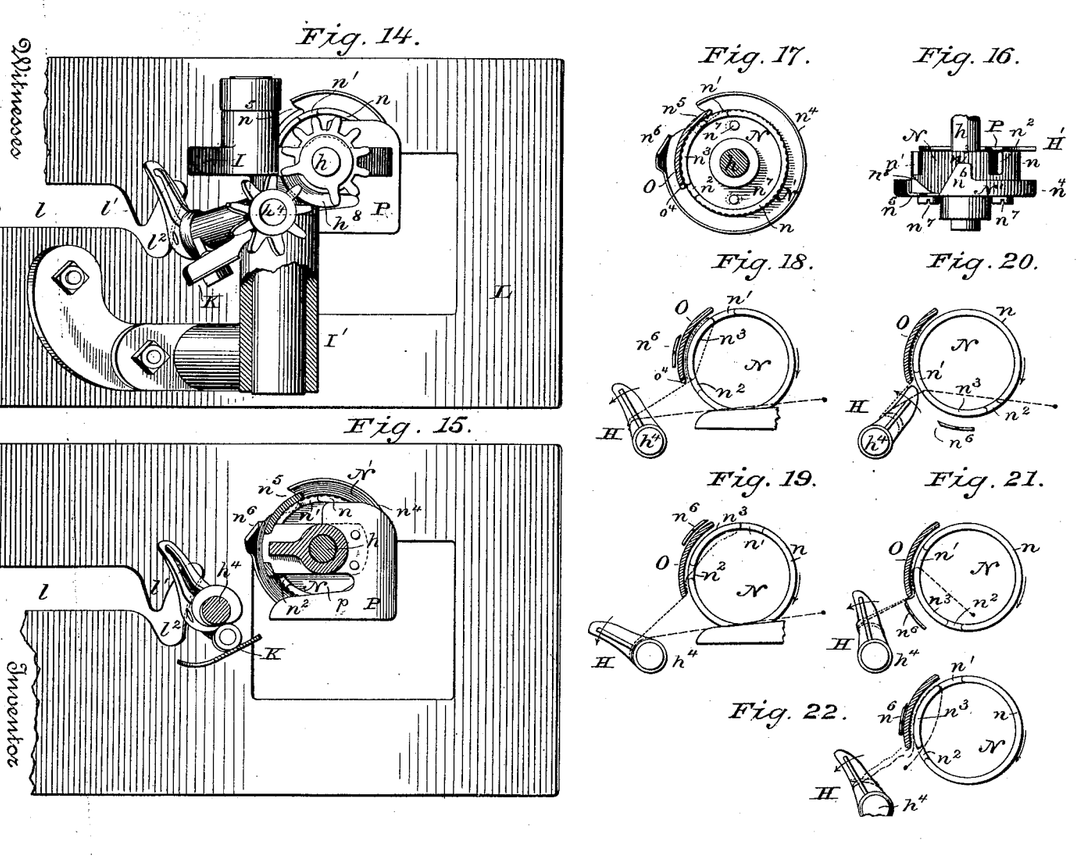
Figs. 14 and 15, top plan views of the tyer-head and adjacent portion of the breast-plate respectively sectioned on lines correspondingly denoted in Fig. 11.
Figs. 16 and 17, details in plan and elevation of the cord holder and cutter.
Figs. 18 to 22, a diagrammatic series illustrating successive stages in the formation of the completed knot.
Figures 25, 26:
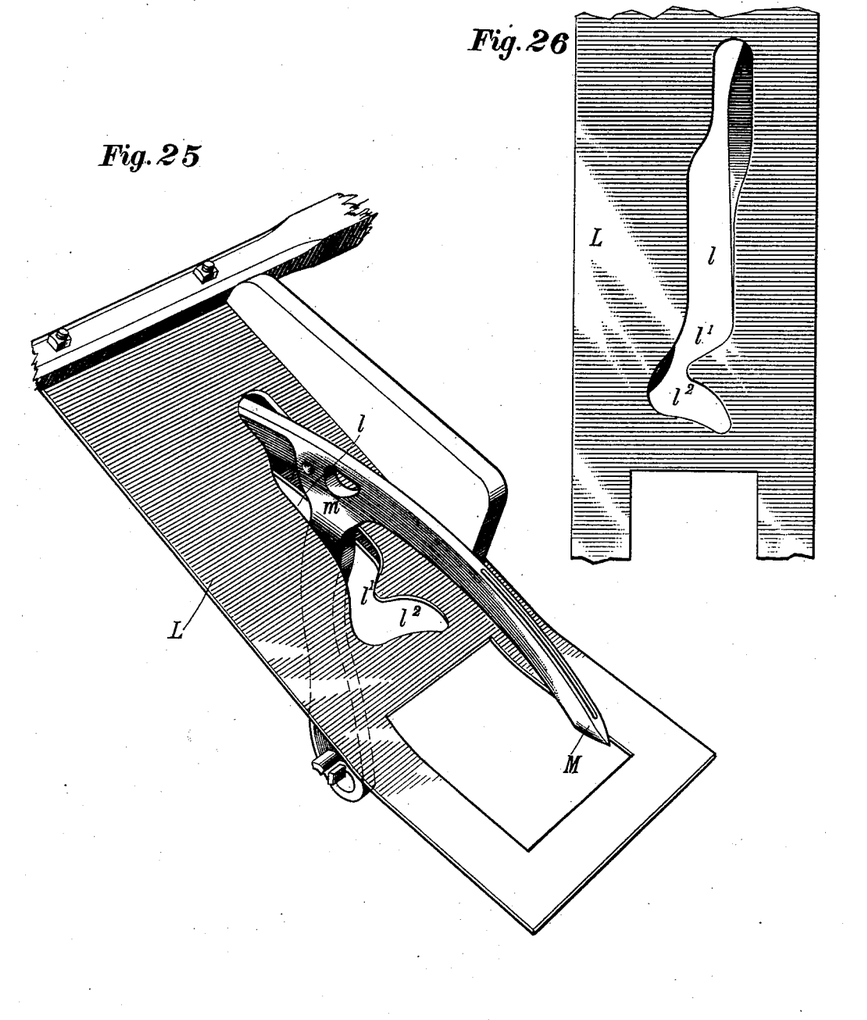
Fig. 25 is a perspective view of the breast-plate and binder-arm, showing the irregular outlines of the cord-slot and the action of the binder-arm playing thereto.
Fig. 26 is a top plan view of a portion of the breast-plate to show more accurately the outlines of the slot in said breast-plate.

In order that the driving-chain may act accurately, its surplus slack must be taken up. This is accomplished by sleeving upon a hub $c$ from the bearing of the packer-shaft alongside the sprocket-wheel thereon an arm C, having at its farther end a rounded lateral offset or runner $c'$, resting upon the upper ply of the chain and tending to press it down. A set-screw $c^2$, passing through the hub of the arm and butting against the said hub from the bearing of the packer-shaft, enables the arm to be adjusted radially to bear with more or less force upon the chain and keep it at any proper degree of tension. Ordinarily, however, the chain will be left quite loose.

To prevent backlash or retrogade movement of the main gear whenever its driving-pinion is unclutched, a plate-spring C' is seated as to its heel upon the exposed end of the stub-axle, which bears said pinion, and secured thereto by a screw $c^3$ and steady-pin $c^4$ or other preventive of rotation. The free end of this spring normally rests against the rim of the main gear and rides thereover when the gear revolves; but just as the gear is terminating its revolution a lug $c^5$, which may be a lateral extension of one of its teeth, strikes the spring and pushes it aside and is immediately after dogged by said spring at the instant the gear is thrown out of action.

Figure 1:
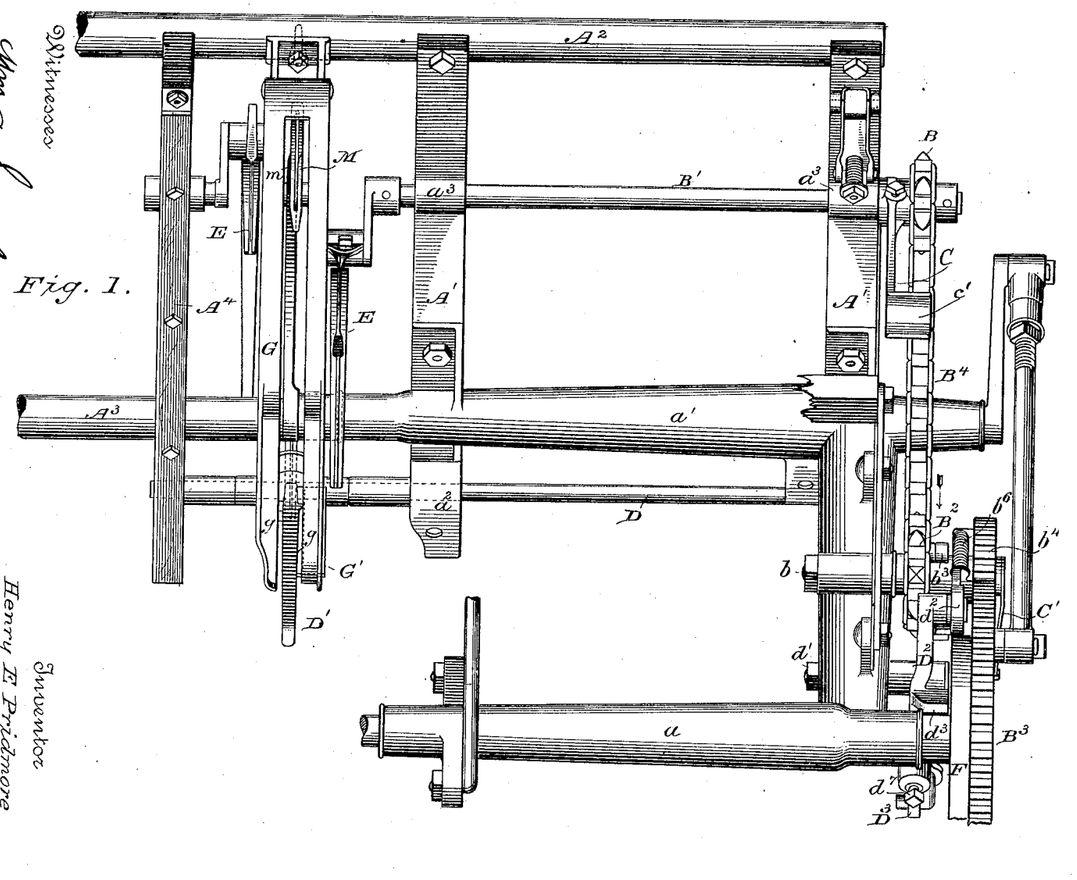
Figure 1 is a top plan view of a binding attachment embodying features of my invention, but with knotter-head, breast-plate, and decking omitted and the rear end broken away.
Figure 2:
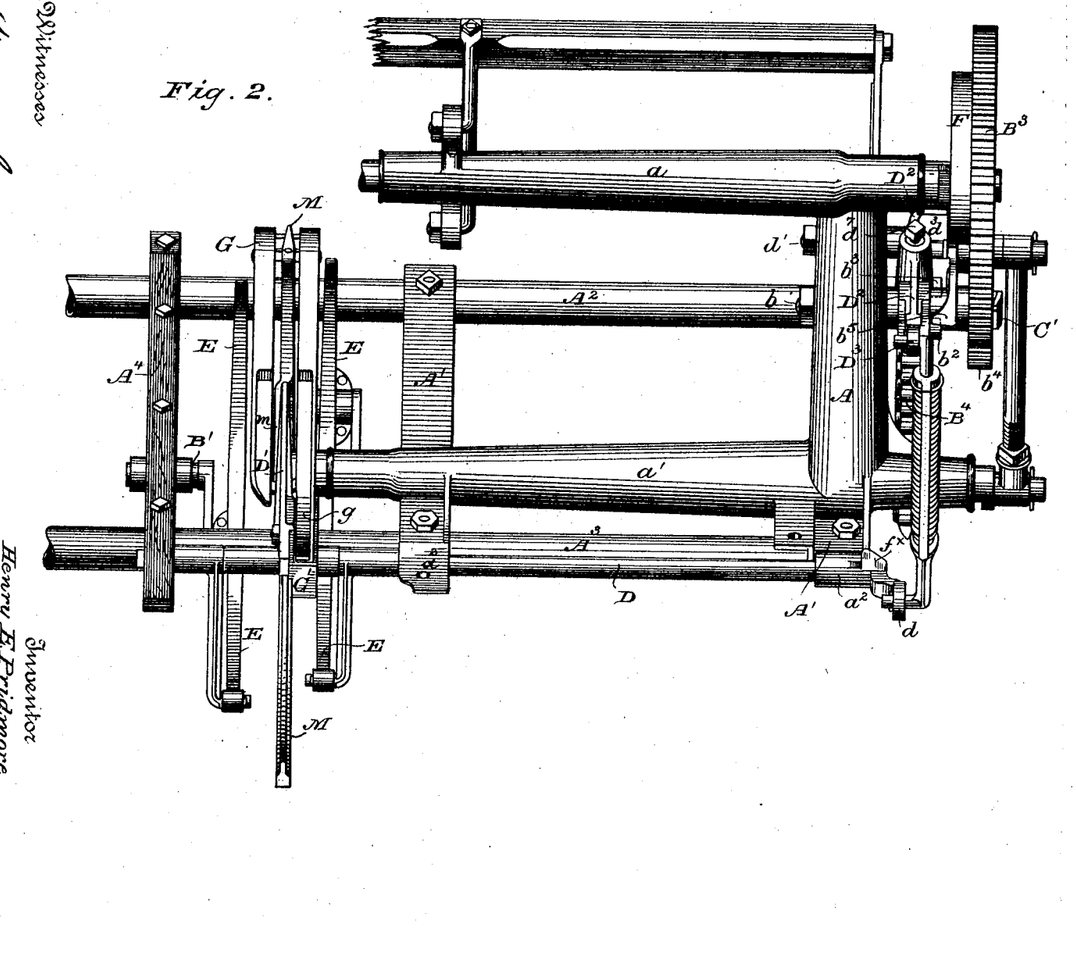
Fig. 2, an elevation from the stubble side of the machine with the same parts omitted.
Figure 3:
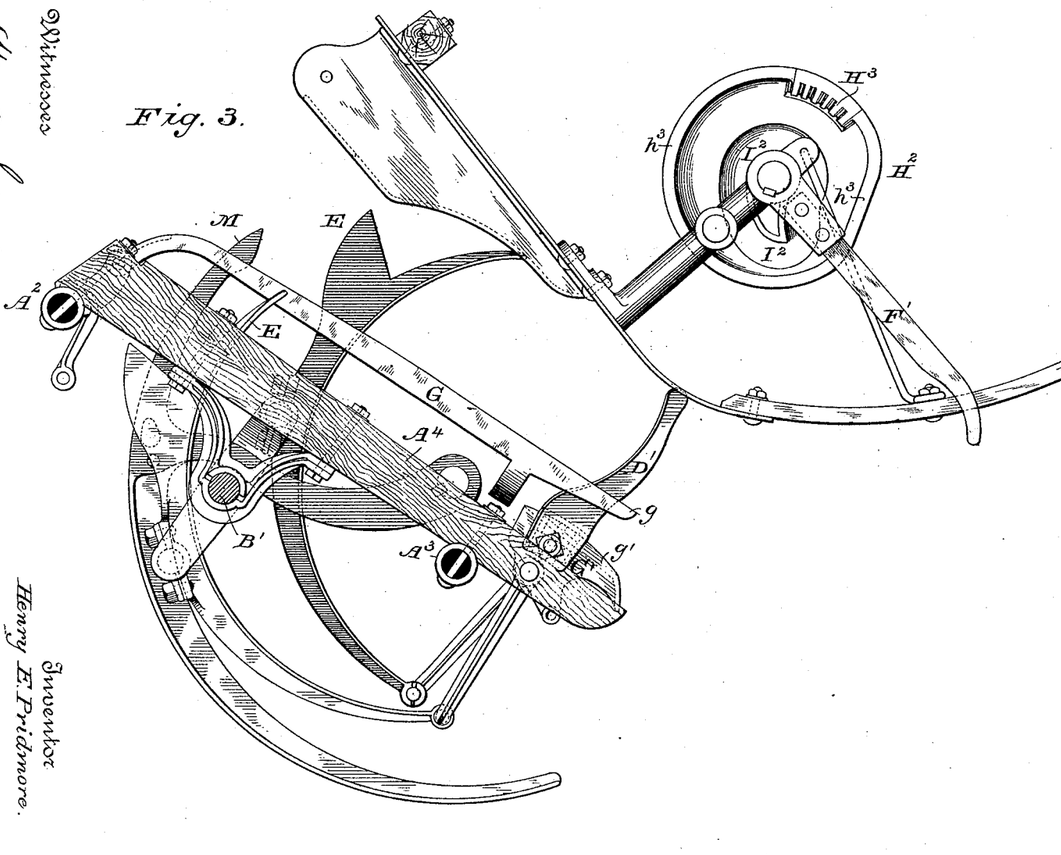
Fig. 3, a rear end elevation with like omissions, except that the tyer-cam, breast-plate, and ejector are shown.
Figures 4, 23, 24:
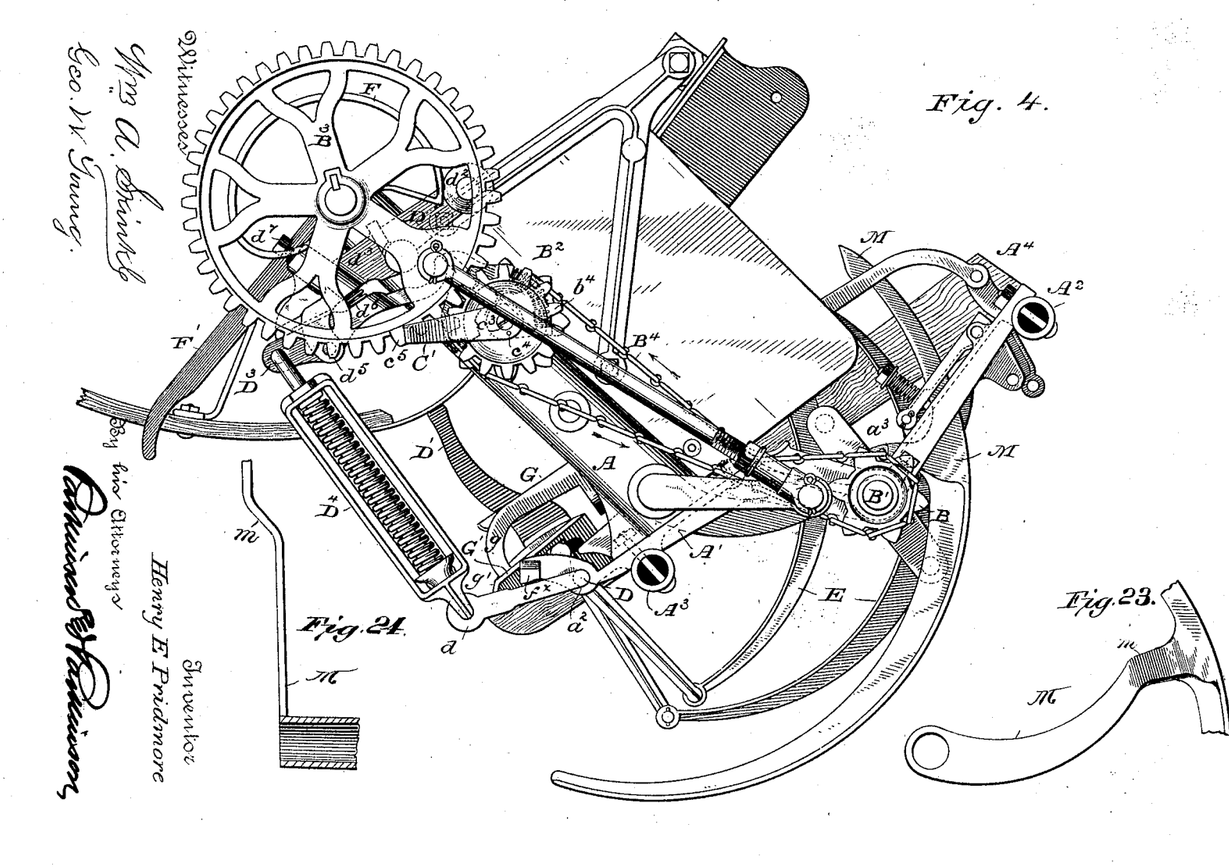
Figure 5:
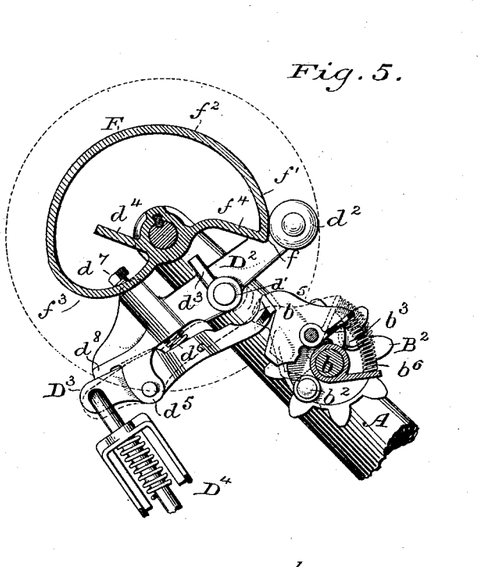
Fig. 5, a detail view of the trip-clutch and tripping devices immediately accessory thereto from the front.
Figure 6:
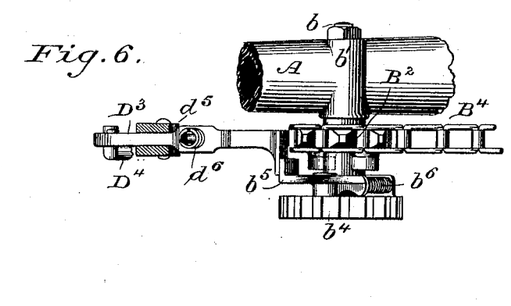
Fig. 6, a detail view, partly sectioned and seen from above, of said clutch and tripping devices.
Figure 7:
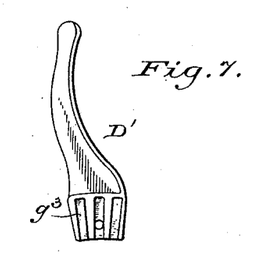
Fig. 7, a side elevation of the outside compressing and tripping finger detached.

In said former machine the compressing and tripping finger (or fingers) was mounted upon a rock-shaft and permitted a limited play about its axis and was connected by a lever with an independent trip-shaft parallel with said rock-shaft, so as to actuate the trip-shaft without moving the rock-shaft. A crank from this rock-shaft and a pivoted lever operated by a cam upon or in the side of the main gear were joined by an elastically-yielding link or pitman, so that the rock-shaft might be oscillated at the proper moment after the binder was started to throw the tripping and compressing fingers down beneath the decking and permit the bound sheaf to be ejected, and then again raise them to close the grain-passage and receive the incoming gavel. Herein a rock-shaft D is employed in the same or substantially the same position and having, like the former, a crank $d$ at its outer end beneath the main gear; but the compressing and tripping finger or fingers D' are rigidly secured thereto, or else so secured that when pressed back they will oscillate the shaft to a greater or less extent. The former parallel trip-shaft and the intermediate lever are both dispensed with, as well as the low-down trip-latch operated by said trip-shaft in the old construction. A cam-controlled lever $D^2$, pivoted upon a stub-axle $d'$ from the main bracket, carrying an anti-friction roll $d^2$ upon a lateral stud from its heel end and having a stop-finger $d^3$ to be struck at a certain time by a tappet $d^4$ on the hub of the main gear, for a purpose presently explained, also governs the movement of the rock-shaft or "compressor-shaft," as it may hereinafter be called, but differs greatly in construction and relations from its predecessor, and the trip-latch $D^3$ is pivoted to a hanger $d^5$ from the outer end of this lever, extending inwardly from the pivotal point a sufficient distance (advisably beyond the pivot of the lever) to bring its nose into position to stop the trip-dog and between said nose and pivot pressed down from the lever and toward the path of the dog by means of a spring $d^6$, adjustable in stress by a screw $d^7$, set in the lever. A stop $d^8$ at the extreme outer end of the lever intercepts the heel of the latch whenever its nose has reached the path of the dog and bars it from further movement upon its pivot under the force of the spring. The outer or heel end of the trip-latch is connected with the crank-arm from the compressor-shaft by means of a yielding or elastic link or pitman $D^4$, practically the same as heretofore, except for this fact, that it is united to the cam-controlled lever only through the interposition of the trip-latch. Thus whenever the trip-finger is pressed back by the gavel accumulating against it under the forcible action of the packers E the rock-shaft will be oscillated outward, the spring-pitman drawn down, and the trip-latch moved upon its pivot against the resistance of its own proper spring, so as to raise its nose out of the path of the trip-dog and release the latter, which will thereupon fly into engagement, clutching the sprocket-wheel and pinion together and starting the binder. Were the nose of the latch to extend short of the lever center, the wear of the roller on said lever and of the controlling-cam might eventually allow it to fall into the path of the dog; but when it is, as above advised, extended to the inner side of said center the only effect of such wear is to carry it farther out of the range of the clutch. The cam F, upon which the roller at the heel end of the just-mentioned lever travels and by which said lever is controlled in its movements, may be either a groove cut in the gear or, preferably, is a rib projecting from the side of said gear, and starting from the position of rest shown in Fig. 5 is formed with a short concentric reach $f$, which permits the binder to start and gather headway without the labor of simultaneously actuating the compressor, then has an abrupt rise $f'$, which depresses the heel end of the lever, thus raising the outer or free end, to which the trip-latch is pivoted, and drawing upon the spring-pitman, so as to tend to oscillate the compressor-shaft inwardly and carry the compressor or tripping-finger against the gavel. Such movement of the compressor is prevented or, rather, limited, however, by means of a stop $f^\times$, projecting from the outer end of the front metal transverse frame-bar into position to stay the upward movement of the crank on said compressor-shaft after a certain space sufficient to carry the compressor a slight distance inward to additionally compact the gavel. Therefore the movement of the lever, acting first upon the pivoted trip-latch and then through the heel of the latter, encountering the resistance of the pitman, causes the latch-spring to yield and the latch to be closed up against the under side of the lever and held out of the way of the trip-dog as it comes around again in the revolutions of the sprocket-wheel and pinion. This arrangement also insures the removal of the latch from the path of the dog when the machine is running empty. The rise $f'$ is succeeded by a slow eccentric reach $f^2$, which continually increases the compression of the spring-pitman, and consequently the resistance of the compressor, without, however, advancing the latter, on account of the stop $f^\times$ barring oscillation of its shaft until the moment comes for the ejection of the gavel, when it merges into a rapidly-insetting reach $f^3$, and at the same time the before-mentioned tappet $d^4$, projecting from the hub of the main gear adjacent to said cam and provided for greater certainty only, strikes the lug $d^3$, which projects from the lever or its hub and rocks said lever positively upon its pivot, carrying down both the trip-latch and the pitman, oscillating the compressor-shaft outward a sufficient distance to swing the trip-finger beneath the decking, while the ejector-fingers F' sweep around and discharge the bound sheaf. Directly thereafter the cam-rib has its final reach $f^4$ extending sharply outward or in a radial direction, depressing suddenly and instantaneously the heel end of the lever and lifting its outer end, closing the compressor and bringing the trip-latch, which is now released from the strain of the spring-pitman, into position to stop and unclutch the trip-dog.

Where the table-trip has been heretofore employed, it has actuated a lever-arm from the trip-shaft, which, as already stated, ran parallel with the compressor rock-shaft. This trip-shaft having now been dispensed with, the same effect is obtained by extending one or both of the side bars $g$ of the table-trip G beyond the compressor or trip finger and bending it down so as to rest upon an outwardly-projecting cam $g'$ on the stubble side of said finger or of the block G', which connects said finger with the rock-shaft, so that when the table-trip is depressed it will tend to rock said block and shaft in the same direction as will the trip-finger when grain is packed against it, and thus start or assist in starting the machine, and when the compressor-shaft is rocked inward in the initial movement, after the binder is tripped, the table-trip will be lifted against the gavel and assist the trip-finger in compacting it. The compressor or trip-finger is or may be adjustably connected to this supporting-block by means of a tongue $g^2$ upon the block taking into one of a series of grooves $g^3$ in the side of the finger and by a bolt $g^4$ passing through the finger and transverse slot $g^5$ in the block to clamp the two together.

Instead of driving the knotter H and the holder H' both by independent segment-gears on the face of the tyer-cam $H^2$, the holder-spindle $h$ is driven by a segment-gear $H^3$ on the face of said cam of sufficient length to give it a full revolution and then is locked in position by means of a delay-shoe $h'$ on its pinion $h^2$ or upon the spindle and a delay-ledge $h^3$ on the face of the cam, and the knotter-spindle $h^4$ is arranged obliquely to said holder-spindle, not only directed inwardly therefrom, but also sufficiently to the rear or away from the plane in which the binder-arm plays to admit the point of said binder-arm between the two spindles, and is geared thereto by means of bevel-pinions $h^5$ and $h^6$ at the head of each, whereby a complete revolution of the holder-spindle gives a complete revolution of the knotter-spindle and stops the knotter-jaws in position to intercept and receive the cord. It is necessary or desirable, however, that the holder should start somewhat in advance of the knotter, and therefore the pinion at the head of the knotter-spindle has a delay-shoe $h^7$, which engages with a delay-ledge $h^8$ upon the pinion at the head of the holder-spindle, whereby the knotter is not actuated until the holder has moved sufficiently for its purpose, which, in the present instance, is really to slightly release the grasp upon the strand of cord previously held, so that it may be drawn resistingly from the holder as the knotter turns and demands slack.

The knotter and holder are both mounted upon a stock I, pivoted upon a short axle $i$ from the bracket I', which connects the breast-plate with the tyer-shaft, so that after the tying operation is completed they may be swung away from the gavel, close to which the knot has been tied, with the knotter-jaws trending inward in order to strip the loop therefrom and tighten the knot, and then swung back into and retained in position to tie the next knot close to the gavel, this swinging movement being controlled by means of a cam-groove $I^2$ in the face of the tyer-cam, having, essentially, the outline shown, into which projects a roller $i'$ from the heel of the swinging stock. The knotter itself is of the ordinary form and its jaws are controlled as usual, except that the spring-cam K, by which its pivoted jaw is closed, instead of being transverse to the spindles, as heretofore, has its shank extended upward practically parallel with the spindle seated against a lug $k$ from the stock near the upper end of said spindle and secured to said stock and adjustable in tension by means of a set-screw $k'$, arranged between the lug and the cam-surface, while snugs $k^2$ prevent it from being moved laterally by the rotation of the tying-jaws, this new arrangement causing the pressure upon the pivoted jaw to be more equable at all points of the revolution while the cam and jaw are engaged. The cord-slot $l$ in the breast-plate L is of somewhat irregular outline, so as to afford an oblique finger $l'$, setting from one side of said slot beneath the knotter in its revolution into a recess $l^2$ at the other side and serving to deflect the cord and guide it more perfectly over the knotting-jaws. That the binder-arm may play through this slot and come up close to the finger, notwithstanding the irregular or rather oblique outline of the slot, it has a jog or bend $m$ in its shank.

So far as regards other features of this improvement any ordinary holder or holder-disk that will properly present the cord to the knotter may be employed; but that which has been devised in the present machine differs materially from those in general use nowadays both in construction, operation, and manner of holding the cord. Ordinarily only one strand of the cord is grasped in the holder during the incipiency of the knotting operation and the holder either moves toward the knotter or else the knotter toward the holder to gain slack from that strand, while the other strand, presented by the binder-arm, has the necessary slack pulled through the eye of said arm, and ultimately from the cord-receptacle, this latter strand not being grasped in the holder until the knot has been partly laid, when the holder moves, releasing the old strand and grasping and severing the new strand, which in its turn becomes the old strand as the binder-arm recedes.

The present holder, instead of having as its active member a flat disk with notches equidistant around its periphery working within a shoe or saddle that embraces it on both sides along a considerable segment of its periphery and turning the space of one or two notches only to each binding operation, is what may be denominated a "crown-disk"—that is, it is formed with a discular body N and has an upturned flange $n$ around its periphery, which if notched at regular intervals would present the appearace of a crown-wheel, but is herein only notched at two points, the first notch $n'$ being hereinafter termed the "front" or "advancing" notch and the other $n^2$ the "rear" or "belaying" notch, leaving one broad tooth $n^3$, serving as a clamping and belay tooth, upstanding between these two notches, while the rest of the periphery is unbroken, and it is given a full revolution every time the binder is tripped. The exterior or periphery of the crown-disk, including the upturned flange, is channeled, grooved, or serrated perpendicularly to the body to better grasp the cord, and beyond this flange from the bottom of the disk projects a web N', which for convenience is formed from an independent plate of hardened metal having a concentric flange $n^4$ extending up slightly to about the level of the bottom of the notches and serving to prevent the strands of cord from falling below the proper level or from being displaced—that is, to hold them up substantially parallel with each other during the knotting operation between the grasping-point and the knotter-jaws. Nearly opposite to the first or advancing notch in the holder-disk or crown-disk this exterior flange and web are cut away, as at $n^5$, and a little in rear of said notch at a point where the cut-away portion terminates the flange rises into a knife-blade $n^6$, provided with a cutting-edge, whereby the strands of cord are severed.

In order to set the knife to insure its action at the best moment for perfect completion of the knot, the plate N' is attached to the crown-disk proper by clamping-screws $n^7$, passing through arc slots in said plate, so that when the screws are loosened it may be turned upon its axis to advance the knife-blade and then held in the proper adjustment by tightening the screws once more. From a point just in advance of the front notch, and slightly above the bottom of said notch, the exterior periphery of the crown-disk is cut away somewhat to form a slanting shoulder $n^8$, which terminates at the bottom of said disk over the cut-away part of the exterior web and flange and slightly in advance of the knife-edge and serves to discharge the fag ends, and also at the proper time, as will presently appear, to release the grasp upon the old end of the band.

To the stock which supports the holder-spindle is pivoted at $o$ the shank of a clamping-shoe O, which depends on the inner or grain side into the groove formed by the periphery of the crown-disk and the encircling exterior flange and presses against the exterior of said disk, being steadied thereagainst by a dowel-pin $o'$ from said stock, entering a suitable guide slot or recess in said shoe and held yieldingly thereagainst with a force determinable, according to circumstances, by means of a spiral spring $o^2$, encircling a screw-bolt $o^3$, threaded into the stock. The initial vertical edge of the shoe, or that edge which the cord first comes in contact with, is slightly rounded out or recessed, as at $o^4$, so that the strand may not occasionally slip down underneath when forced past by the movement of the disk.

Above the crown-disk, and practically resting upon the edge of its upturned flange and in a large part covering and shielding the latter and preventing the accumulation of débris in the cup which it presents, is a shield or plate P, slotted from the inner side in the plane in which the cord is laid and having the mouth of the slot $p$ flared or rounded, so as to properly guide the cord laid by the binder-arm into position to fall into the proper notch in the holder.

With this construction the operation is as follows, supposing the needle to have been just threaded and the cord not yet to have been grasped by the holder: The second or belaying notch of the crown-disk is at this moment—that is, just before the binder is tripped—at the rear side or edge of the shoe or that side adjacent to the cord-slot just beneath the entrance to the slot in the guard-plate and practically in the plane in which the cord is laid by the binder-arm, and the knotter is in position to intercept the cord as the binder-arm rises. Now the trip-finger having been pushed back and the binder brought into engagement, the binder-arm rises, the holder begins to revolve, and the knotter immediately follows; but the strand of cord brought up by the binder-arm has been held at such elevation by the guard-plate and by the fact that it is laid across the upper side or chin of the knotter-jaws that it has not fallen into the belaying-notch, and is therefore not grasped. The revolution of the knotter will now tie a false knot in the single strand of cord, thereby depressing that part stretched between the jaws and the nose of the binder-arm at such moment that as the first notch or advancing notch of the crown-disk is brought around beneath the slot in the guard-plate this strand will fall therein and will be carried against the shoe and clamped between it and the belay-tooth of the holder-flange and immediately thereafter will be severed. The revolution of the crown-disk will continue until it reaches its original position—that is, with the belaying-notch beneath the slot in the guard-plate and adjacent to the rear edge of the holder-shoe and the front notch almost but not quite past the front edge of the shoe—and the strand that has just been grasped will extend from said front notch diagonally across the disk and through the slot in the guard-plate to the eye of the binder-arm, which then receding will belay it over the tooth between the two notches and through the rear notch, thence carrying it over the knotter-jaws and down beneath the decking. Then, a sufficient gavel having accumulated to start the binder, the needle will again rise, bringing up the second strand, which, as before, will at first be held raised out of the grasp of the rear notch in the ensuing initial part of the revolution of the crown-disk and while the knotter is revolving to lay the loop and grasp the crossed strands. During this interval, however, the strand originally grasped has at the very outset of the revolution of the knotter been carried on by the movement of the crown-disk in such manner that the fag or end originally clamped between the tooth and the shoe has been pushed past said shoe and released therefrom, so that it is no longer belayed about the tooth, while simultaneously therewith that part of said strand that was laid in the rear notch in the previous recession of the needle has been pushed in between the shoe and that part of the crown-disk flange succeeding to said rear notch, so as to be grasped and held only by the pressure between those two surfaces, which pressure is so graduated that the strand may be pulled from between them as the knotter demands slack. Just as the crossed ends of the band enter between the jaws of the knotter and the pivoted jaw of the latter comes in contact with the spring-cam and is about to be closed the revolution of the crown-disk has brought the first notch around to such a point that the exterior slanting shoulder strikes the strand originally grasped, while the new strand, it will be remembered, is just falling into the notch to be itself grasped, and the further revolution of the disk causes said flange to force the old strand down out of the grip of the shoe, thus completely releasing said strand at the instant or just after the instant that the knotter-jaws close and securely grasp it, while the knife at the same moment severs the new strand between the knotter and the holder and also, should the clearing-flange have failed to work efficiently, insures the release of the old strand by likewise severing it. The knot is now formed and free from the holder and the new end grasped. The holder comes to rest and the knotter is consequently stopped, but the supporting-bracket for the holder and knotter-spindles is immediately swung away from the sheaf to strip and tighten the knot, the compressor or trip-finger opens, the ejector sweeping around discharges the sheave, the binder-arm recedes beneath the decking, the trip-finger again rises, and the machine is thrown out of action to await the accumulation of the next gavel.

In conclusion it may be stated that although a chain has been described as the means of communicating motion from the packer-shaft to the clutch-gear on the stub-axle, yet such arrangement is adopted for lightness only and an idle-gear interposed between the spur-pinions on the two shafts is to be considered a full equivalent.

I claim—

1. The combination, substantially as hereinbefore set forth, of the main gear, a sprocket-wheel on the constantly-driven packer-shaft, an opposing sprocket-wheel on a stub-axle adjacent to the main gear, a loose pinion mounted on said stub-axle and meshing with the main gear, a trip-clutch between said loose pinion and the adjacent sprocket-wheel, a trip-latch operating to hold the trip-dog out of engagement, the outside tripping and compressing finger mounted on a rock-shaft, and a link directly connecting a crank from said rock-shaft with the heel of the trip-latch.

2. The combination, substantially as hereinbefore set forth, with the trip-clutch, of the pivoted trip-latch, the tripping and compressing finger closing the passage from the grain-receptacle, the rock-shaft on which it is mounted, and the yielding link connecting an arm from said rock-shaft with the heel of the trip-latch.

3. The combination, substantially as hereinbefore set forth, with a pinion meshing directly with the main gear, of a trip-dog carried by said pinion, a pivoted trip-latch to disengage said trip-dog, an outside tripping and compressing finger mounted on a rock-shaft, and a yielding pitman connection between an arm of said rock-shaft and the heel of the trip-latch.

4. The combination, substantially as hereinbefore set forth, of the main gear, a pinion meshing therewith, a trip-dog carried by said pinion and engaging with lugs from a constantly-driven part of the gearing, a lever pivoted to the frame and vibrated by a cam on said main gear, a trip-latch pivoted to the outer end of said lever, a trip-finger mounted on a rock-shaft, and a pitman connecting an arm from this rock-shaft with the heel of the trip-latch.

5. The combination, substantially as hereinbefore set forth, of the main gear, a pinion meshing therewith and carrying a trip-dog, constantly-driven mechanism with which said dog engages, a lever pivoted to the frame and vibrated by a cam on said main gear, a trip-latch pivoted to the free end of said lever, a spring interposed between the trip-latch and the lever to press the nose of the trip-latch down into the path of the trip-dog, a trip-finger mounted on a rock-shaft, and a pitman connecting an arm from said rock-shaft with the heel of the trip-latch.

6. The combination, substantially as hereinbefore set forth, of the main gear, a pinion meshing therewith and carrying a trip-dog, a constantly-driven wheel having lugs with which said trip-dog engages, a lever pivoted to the frame and vibrated by a cam on the main gear, a trip-latch pivoted to the outer end of said lever, a spring to press said trip-latch down to bring its nose into the path of the trip-dog, and a stop on the lever to limit its downward movement, a trip-finger mounted on a rock-shaft, and an elastically-yielding link connecting an arm from said rock-shaft with the heel of the trip-latch.

7. The combination, substantially as hereinbefore set forth, with the main gear and its driving-pinion and the trip-dog carried by said pinion, of the lever pivoted to the frame and vibrated by a cam on said main gear, the trip-latch pivoted to the outer end of the lever and extending inward past the center of said lever, the spring pressing said trip-latch down and the stop which limits its movement, the trip-finger and its rock-shaft, and the spring-link connecting an arm from said rock-shaft with the heel of the trip-lever.

8. The combination, substantially as hereinbefore set forth, with the trip-finger and its rock-shaft and the arm from said rock-shaft, of the stop on the frame to limit the inward movement of the trip-finger, the trip-latch, the lever to which it is pivoted, the cam which vibrates said lever, having a slow upward incline or eccentric to lift the lever gradually until the close of the binding operation, and the spring-link connecting the arm from the compressor-shaft with the heel of the trip-latch, whereby the compressing-finger is first carried inward against the gavel until stopped by the contact of its arm with said stop and then the stress of the spring-pitman constantly increased to increase the resistance of the compressor.

9. The combination, substantially as hereinbefore set forth, of the trip-latch, the lever to which it is pivoted, the cam which actuates said lever, having first a concentric reach that the machine may start without moving the lever, then a quick outward incline, then a slow outward or eccentric reach, the tripping and compressing finger, the rock-shaft on which it is mounted, the arm from said rock-shaft, the stop on the frame, and the spring-link connecting the heel of the trip-latch with said arm, for the purpose described.

10. The combination, substantially as hereinbefore set forth, of the trip-latch, the lever to which it is pivoted, the cam which vibrates said lever, having, practically, the outline shown and described, the lug from said lever and the tappet revolving with the shaft which supports said cam, the tripping and compressing finger, the rock-shaft on which it is mounted, and the spring-link connecting an arm from said rock-shaft with the heel of the trip-finger.

11. The combination, substantially as hereinbefore set forth, with the trip-finger and its rock-shaft and the cam at the base of the trip-finger, of the table-trip extended to rest on said cam and means for rocking said shaft to carry the trip-finger inward after the binder starts, whereby the table-trip is lifted against the gavel to serve as an under compressor.

12. The combination, substantially as hereinbefore set forth, with the outside trip-finger and its rock-shaft and the cam at the base of said finger, of the table-trip extended to rest on said cam, the trip-latch link connected to an arm from said rock-shaft, and means whereby said trip-latch is raised after the binder starts to carry the trip-finger inward, thereby lifting the table-trip to cause it to serve as an under compressor.

13. The combination, substantially as hereinbefore set forth, with the outside trip-finger and the rock-shaft on which it is mounted, of the cam at the base of said finger, the table-trip extended to rest on said cam, the arm from said rock-shaft, and the stop on the frame against which said arm is carried, the spring-link connecting said arm with the heel of the trip-latch, and means whereby said trip-latch is lifted after the binder starts to carry the trip-finger forward to operate the table-trip to serve as an under compressor.

14. The combination, substantially as hereinbefore set forth, with the outside trip-finger, the rock-shaft on which it is mounted, and the cam at the base of the trip-finger, of the table-trip extended to rest on said cam, the arm from the rock-shaft, the stop against which said arm is carried, the trip-latch, the lever to which it is pivoted, the cam which vibrates said lever upward after the binder starts, and the spring-link connecting the heel of the trip-latch with the rock-shaft.

15. The combination, substantially as hereinbefore set forth, of the tyer-cam having a segment-rack and delay-surface, the holder-spindle having a pinion and delay-shoe engaging with said rack and delay-surface, and the knotter-spindle engaged with said holder-spindle by intermeshing gears and driven therefrom.

16. The combination, substantially as hereinbefore set forth, of the tyer-cam having a segment-rack and delay-surface, the holder-spindle having a driving-pinion and delay-shoe engaging with said rack and delay-surface, the knotter-spindle arranged obliquely to the holder-spindle, the intermeshing bevel-gears at the head of each spindle, and the binder-arm arranged to pass between the knotter-spindle and holder-spindle.

17. The combination, substantially as hereinbefore set forth, of the holder-spindle having a crown-disk holder at its foot and arranged on one side of the plane of movement of the binder-arm and the knotter-spindle having a tying-bill at its foot and arranged on the other side of said plane of movement.

18. The combination, substantially as hereinbefore set forth, to form a holder, of the crown-disk having a serrated peripheral flange, the shoe pressing against the serrated face of said flange, a notch at its rear to stop the cord from passing beneath, and the spring arranged to press said shoe against the flange.

19. The combination, substantially as hereinbefore set forth, with the crown-disk and its shoe pressing against the exterior of the flange, of the inclined ledge or shoulder at the rear of the advancing notch in said disk.

20. The combination, substantially as hereinbefore set forth, with the crown-disk and the shoe which presses against its periphery, of the web projecting out from the bottom of said disk and upturned into a concentric flange to prevent the strands of cord from falling below the proper level or from being displaced.

21. The combination, substantially as hereinbefore set forth, with the crown-disk and the shoe which presses upon its flange, of the knife revolving with said crown-disk exterior to the shoe.

22. The combination, substantially as hereinbefore set forth, with the crown-disk and its shoe, of the web extending out from the bottom of the disk and having an upturned concentric flange extending up to about the level of the bottom of the notches in said crown-disk and cut away opposite and beneath the advancing notch to permit the fag ends to drop out.

23. The combination, substantially as hereinbefore set forth, with the crown-disk and its shoe, of the plate attached to the bottom of said crown-disk and having an exterior concentric flange, the knife on said plate, and means whereby said plate may be adjusted axially about said disk to advance or retard the action of the knife.

24. The combination, substantially as hereinbefore set forth, with the crown-disk having two notches and a broad belay-tooth between them, of the shoe pressing upon the exterior of the flange and means for giving said crown-disk a complete revolution in each knotting operation.

25. The combination, substantially as hereinbefore set forth, with the crown-disk and its shoe, of the cap covering said crown-disk and slotted to direct the cord-strands into the proper notch, while preventing them from falling into the notch at any other place.

26. The combination, substantially as hereinbefore set forth, of the tyer-cam, the supporting-stock for the holder and knotter spindle pivoted upon the frame eccentrically to the tyer-shaft, means for giving the tying-bill a complete revolution and stopping it with its jaws pointing inward, the cam-groove in the face of the tyer-cam, and a roller from the heel of the swinging stock extended into said cam-groove, whereby the knotter and holder are swung outward after the knot has been laid to strip and tighten it.

HENRY E. PRIDMORE.

Witnesses:
ALICE S. WELLS,
LEONARD VASSALL.